C. H. DAVIS.
VACUUM MILKING MACHINE.
APPLICATION FILED NOV. 11, 1915.
1,271,544.
Patented July 9, 1918.
4 SHEETS—SHEET 1.
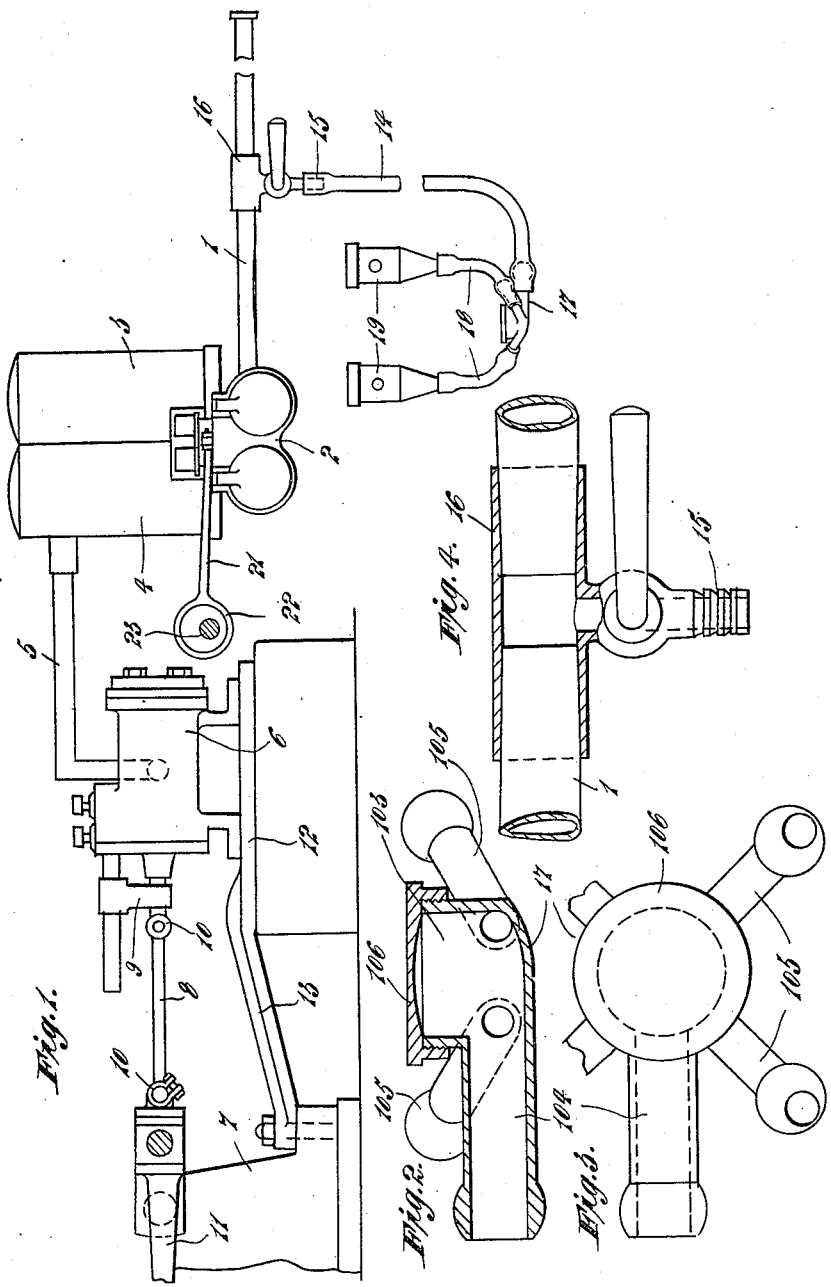
Inventor
Claude Hudson Davis
By H. Van Oesteennel
Attorney C. H. DAVIS.
VACUUM MILKING MACHINE.
APPLICATION FILED NOV. 11, 1915.
1,271,544.
Patented July 9, 1918.
4 SHEETS—SHEET 2.
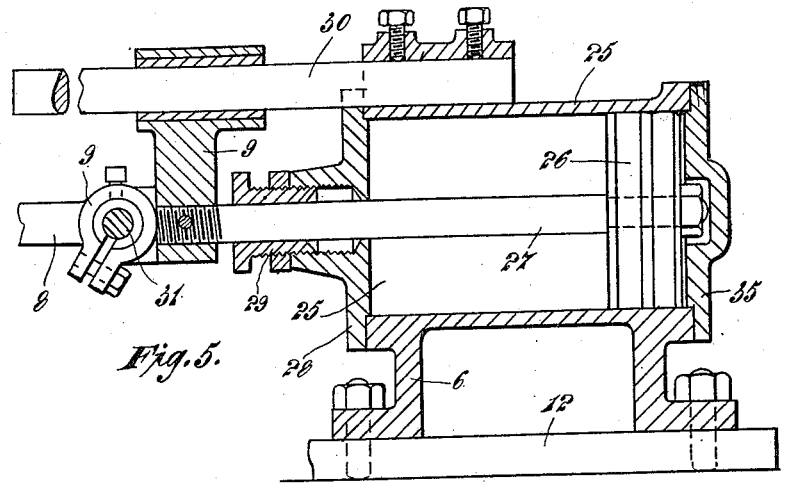
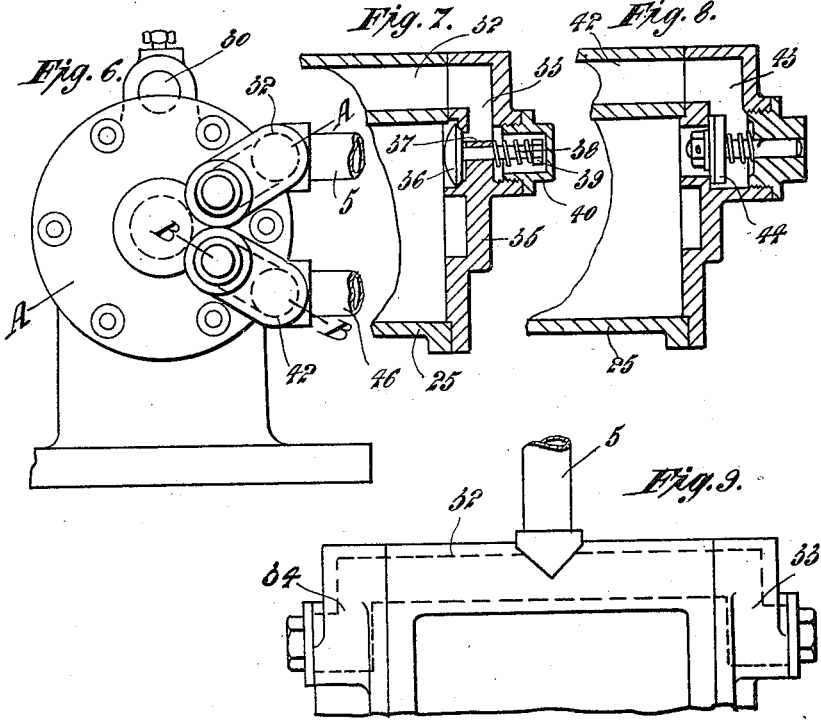
Inventor
Claude Hudson Davis.
By
Attorney C. H. DAVIS.
VACUUM MILKING MACHINE.
APPLICATION FILED NOV. 11, 1915.
1,271,544.
Patented July 9, 1918.
4 SHEETS—SHEET 3.
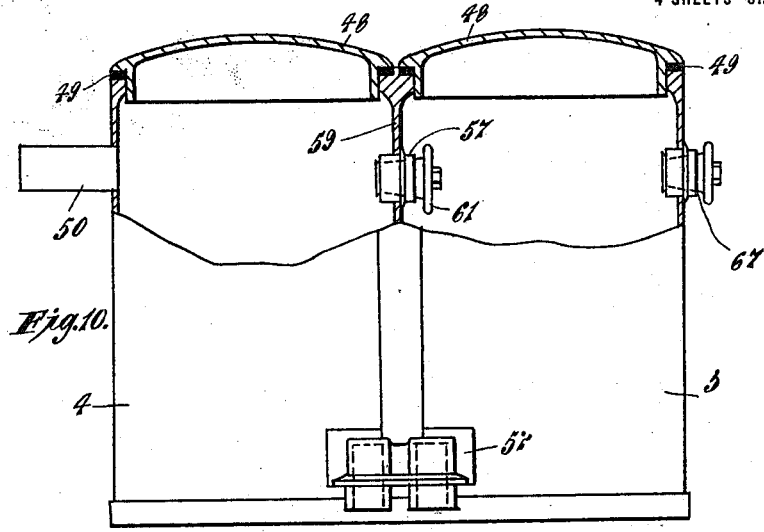
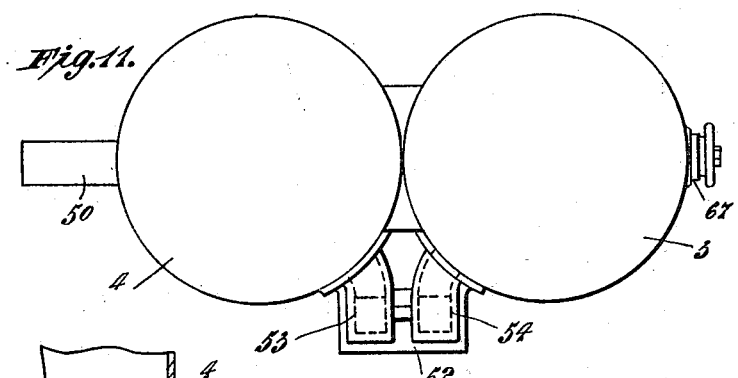
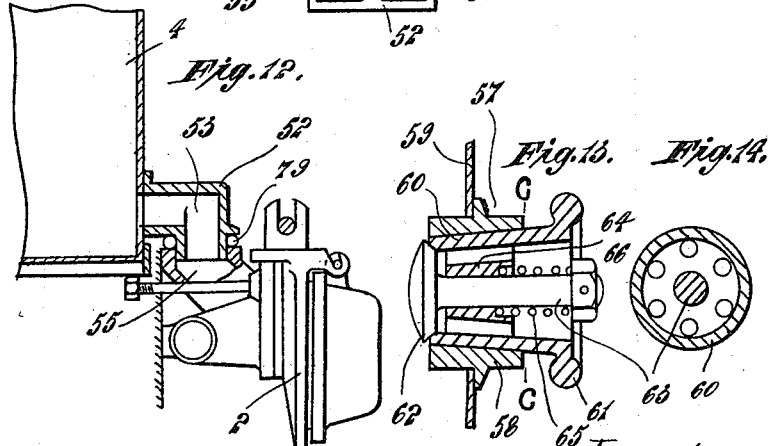
Inventor
Claude Hudson Davis.
By ~~~~~~
Attorney

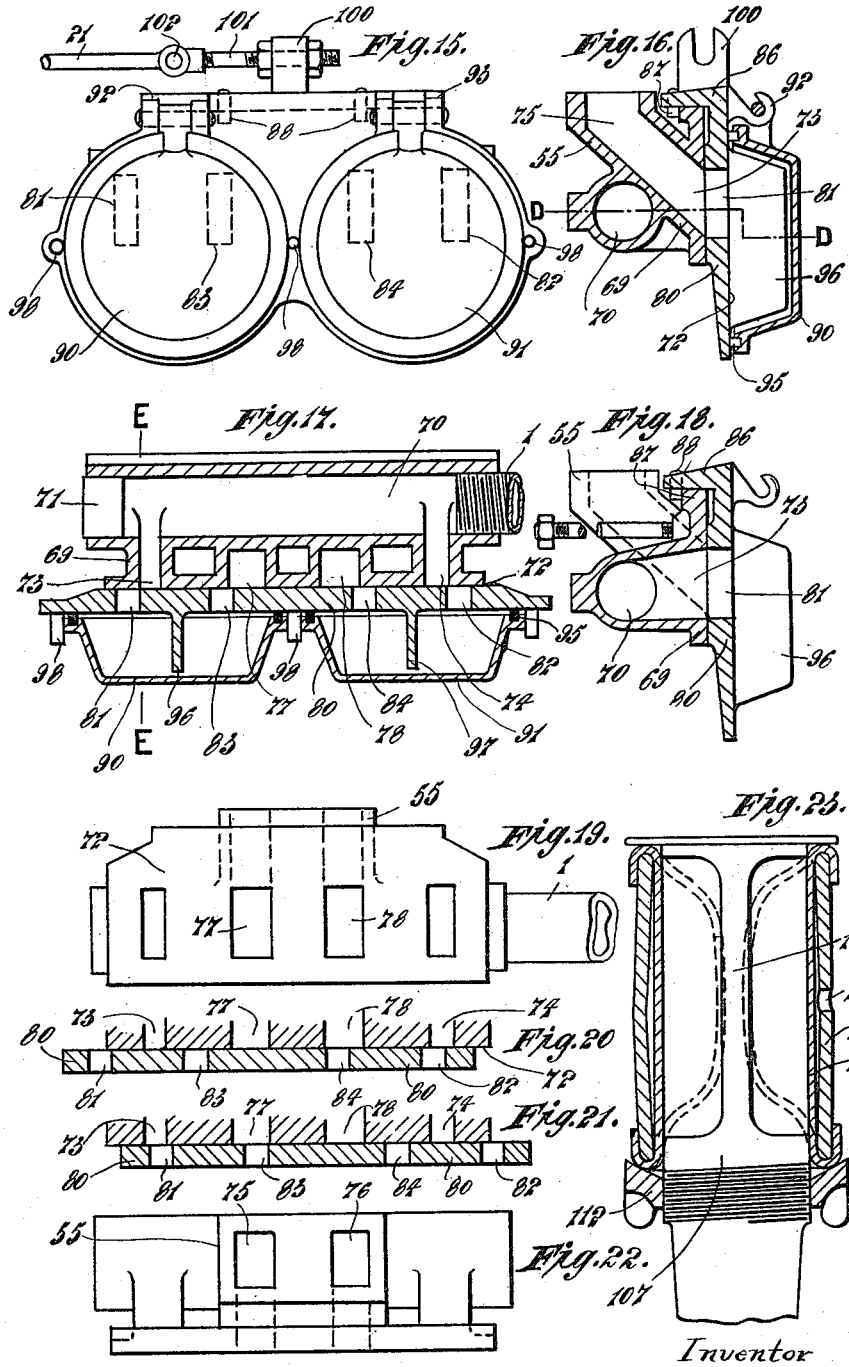

UNITED STATES PATENT OFFICE.

CLAUDE HUDSON DAVIS, OF WANGANUI, NEW ZEALAND.

VACUUM MILKING-MACHINE.

1,271,544.  Specification of Letters Patent.  Patented July 9, 1918.

Application filed November 11, 1915. Serial No. 60,893.

*To all whom it may concern:*

Be it known that I, CLAUDE HUDSON DAVIS, a subject of the King of Great Britain and Ireland, and residing at Number 10 Church Place, Wanganui, in the Provincial District of Wellington, in the Dominion of New Zealand, have invented a new and useful Improvement in Vacuum Milking-Machines; and I do hereby declare the following to be a full, clear, and exact description of the same.

This invention relates to milking machines operated by vacuum and particularly to that class of machine wherein the milk is automatically released by separate releasing apparatus from a milk pipe extending throughout the byre.

According to this invention two different vacuum pressures are employed to obtain the required pulsations of the teat-cup inflation without the use of pulsators, means being provided to alternately admit the two different vacuum pressures to the milk pipe and to release milk from the said pipe. One vacuum pressure is fairly low and the other is considerably higher.

Throughout the specification the term "low vacuum" or "low vacuum pressure" means an air pressure only a few inches below that of the atmosphere, while a "high vacuum" or "high vacuum pressure" means an air pressure considerably below that of "low vacuum pressure."

The invention will be described in detail with the aid of the accompanying drawings and the novel features thereof pointed out in the claims.

On the drawings:—

Figure 1 is a side elevation showing the different portions of the machine assembled.

Fig. 2 is a cross section through the claw.

Fig. 3 is a plan of the claw.

Fig. 4 is a section of a milk pipe coupling.

Fig. 5 is a longitudinal section through the vacuum pump.

Fig. 6 is an end view of the vacuum pump.

Fig. 7 is a cross section through the inlet valve on line A—A Fig. 6.

Fig. 8 is a similar view through an exhaust valve taken on line B—B Fig. 6.

Fig. 9 is a part plan of the pump.

Fig. 10 is an elevation partly in section of the vacuum tanks and

Fig. 11 is a plan thereof.

Fig. 12 is a sectional elevation showing how the tanks are connected to the ejecting apparatus.

Fig. 13 is a longitudinal section through a relief valve employed in connection with the vacuum tanks.

Fig. 14 is a cross section on line C—C Fig. 13.

Fig. 15 is a front elevation of the ejecting apparatus.

Fig. 16 is a cross section taken through one of the vacuum ports.

Fig. 17 is a sectional plan corresponding to line D—D Fig. 16.

Fig. 18 is a cross section taken on line E—E Fig. 17.

Fig. 19 is a front view of the inner valve face.

Fig. 20 shows the position of the ports when the valve is at one end of its stroke.

Fig. 21 shows the position of the ports when the valve is at the other end of its stroke.

Fig. 22 is a plan with the front valve face removed.

Fig. 23 is a sectional elevation of a teat cup.

Referring to the drawings and first to Fig. 1 the milk pipe 1 leads to the ejecting apparatus 2 which is alternately brought into communication with a tank 3 of low vacuum and a tank 4 of high vacuum.

A vacuum pipe 5 leads from the tank 4 to an exhaust pump 6 which is operated from an engine 7. The pump 6 and the engine are coupled by a connecting rod 8 pivotally connected to a cross head 9 fixed upon the end of the piston rod of the pump and to a member 10 fixed upon the end of the connecting rod 11 of the engine 7.

The pump 6 is bolted to a base plate 12 mounted upon a concrete base while a web 13 extends forwardly and is bolted to the engine frame as shown.

The flexible branch pipe 14 from the milk pipe 1 to the teat cups is connected to a nipple 15 of a milk pipe coupling 16 (see also Fig. 4) and leads to a claw 17.

From this claw branches 18 lead to the teat cups 19.

The ejecting apparatus 2 is operated by a rod 21 driven from an eccentric 22 mounted upon a shaft 23 rotated from the motive power in any convenient manner.

Referring now to Figs. 5 to 9 inclusive the pump comprises the usual cylinder 25, piston 26, piston rod 27 and front cover 28 carrying a stuffing gland 29.

A guide rod 30 is fixed to the upper side of the cylinder and upon which rod the cross head 9 slides. A pin 31 attaches the connecting rod 8 to the cross-head.

A passage 32 formed upon the exterior of the cylinder 25 throughout the length thereof communicates with ports 33 and 34 formed in the cover 28 and rear cover 35 respectively. Valves 36 having their stems guided in lugs 37 of the covers are normally retained upon their seats by coil springs 38 in compression between the lugs 37 and nuts 39 upon the ends of the stems.

Screw caps 40 enable the valves to be easily accessible for adjusting purposes. The vacuum pipe 5 (see Figs. 6 and 9) leads from the passage 32 to the vacuum tanks 4 (see Fig. 1) and upon both the inward and outward stroke of the piston suction is communicated to the tank 4.

Another passage 42 corresponding to the passage 32 is also formed upon the exterior of the cylinder 25 (see Fig. 8) and communicates with ports 43 in the end covers of the cylinder. Valves 44 opening in the opposite direction to the valves 36 are arranged as shown.

The valve 44 in the cover 28 is not shown but is similar to the valve shown in Fig. 8. An exhaust pipe 46 leads from the passage 42 (see Fig. 6).

Upon both the inward and outward stroke of the piston air that has been drawn from the tank 4 into the cylinder is exhausted through the valves 44 into the passage 42 and into the atmosphere through the pipe 46.

Referring now to Figs. 10 to 14 the vacuum tanks 3 and 4 are cylindrical in form and have lids 48 resting upon rubber rings 49. The pipe 5 from the pump leads to a connection 50 upon the tank 4 as shown.

A connection 52 having two passages 53 and 54 is fitted near the bottom of the tanks. The passage 53 leads to the tank 4, and the passage 54 leads to the tank 3. The lower end of the connection 52 depends into a neck 55 of the ejecting apparatus 2 as clearly indicated in Fig. 12 so that the passages 53 and 54 each communicate with a separate vacuum passage in the neck 55 as will be clearly described hereinafter.

Located between the two tanks 3 and 4 is a regulating valve 57 through which air is exhausted from the tank 3. This valve is clearly shown in Figs. 13 and 14 and comprises a bush 58 fitted into the partition 59 separating the two tanks and having a tapered hole provided in it.

Into this bush a hollow taper plug 60 is fitted having a knurled rim 61 to allow of a good grip for removing the plug. The tapered plug and bush enable the plug to be easily removed for the purpose of cleaning the tanks. At the other end of the plug a valve seat is formed and carries a valve 62 the stem 63 of which is carried through the central portion 64 of the plug. A spring 65 coiled around the stem 63 is in compression between the portion 64 and a nut 66 screwed upon the end of the stem 63 and retains the valve normally upon its seat.

A similar valve 67 is provided upon the outer wall of the tank 3.

By regulating these valves the air conditions in the two chambers may be brought to their required relative difference. The tank 4 being connected directly to the pump 6 will be always of high vacuum while the tank 3 may by the regulation of the valves 57 and 67 be only a few inches below atmospheric pressure.

If desired each tank may be made independent of the other by connecting each tank directly to the suction of the pump 2. In this case the relief valves 57 and 67 would both be located upon the outer wall of the tanks and exposed to the atmosphere.

In Figs. 15 to 22 is illustrated the ejecting apparatus. The neck 55 before referred to is part of a casting 69 having a longitudinal passage 70 into one end of which the end of the milk pipe 1 is fitted. The other end of the passage is closed by a plug 71. The front of the casting is formed into a valve face 72, having rectangular ports 73 and 74 leading from the passage 70 to the valve face 72.

Passages 75 and 76 provided in the neck 55 lead to the valve face 72 forming rectangular ports 77 and 78 therein. The connection 52 (see Fig. 12) fits into the two passages 75 and 76 so that the passages 75 and 76 are respectively in communication with the passages 53 and 54. A rubber ring 79 makes an air tight joint between the connection 52 and the neck 55 (see Fig. 12).

A sliding valve 80 having milk ports 81 and 82 adapted to communicate with the ports 73 and 74 respectively and also vacuum ports 83 and 84 adapted to communicate respectively with the ports 77 and 78 is reciprocated against the face of the valve face 72.

The valve 80 is supported by a flange 86 slidable upon a web 87 integral with the casting 69. Pins 88 in the flange 86 retain the valve in position.

Hanging pocket valves 90 and 91 are pivoted in lugs 92 and 93 integral with the front of the valve 80. The pocket valve 90 covers the ports 81 and 83 and the valve 91 covers the ports 84 and 82. Rubber rings 95 make an air tight joint between the rims of the pocket valves and the outer face of the valves 80.

Baffle plates 96 and 97 project from the front of the valve 80 as shown see Figs. 16, 17 and 18.

Pins 98 in the valve 80 guide the pocket valves when they are opening and closing during the movement of the valve 80.

A lug 100 integral with the flange 86 receives a rod 101 pivoted at 102 to the eccentric rod 21.

The teat cup claw comprises a chamber 103 having a nipple 104 to which is attached the pipe 14 while radial nipples 105 lead to the chamber 103 and have the branches 18 attached thereto. A screw cap 106 closes the top of the chamber 103. This construction enables the claw to be easily and effectively cleaned.

The operation of the machine is as follows:—

High vacuum obtains in the passage 75 from the tank 4 and low vacuum obtains in the passage 76 from the tank 3.

When the slide valve 80 is in the position indicated in Fig. 21 the tank 4, port 77, pocket valve 90, ports 81 and 73, passage 70 and milk pipe 1 are all in communication and have the same air conditions existing within them. The high vacuum extending to the teat cups causes the rubber lining thereof to collapse thus extracting the milk from the teats. The milk is then drawn along the pipe 1 into the passage 70 and thence through the port 73 into the pocket valve 90 the baffle plate 96 preventing the milk being drawn into the vacuum port 83. The slide valve on its return will cut off the port 73 from the vacuum port 77 thus entrapping the milk in the pocket valve 90. The valve continuing its stroke, the port 81 will be carried beyond the valve face and be opened to the atmosphere thereby allowing the valve 90 to open and the milk to flow therefrom.

The valve 80 in returning to the position indicated in Fig. 20 will, immediately the ports 73 and 77 have been cut off, bring the ports 78 and 74 into communication, through the medium of the two ports 84 and 82, and thus bring the milk pipe to the same air conditions as the tank 3. Milk remaining in the pipe 1 will then be drawn through the ports 74 and 82 into the pocket valve 91 whence it is released when the port 82 is exposed to atmosphere as in Fig. 21.

When the milk pipe is in the same air condition as the tank 3 the vacuum existing in the teat cups will not be sufficient to collapse the rubber lining or inflation to any great extent but will be sufficient to retain the teat cups on the teats. The rubber lining will, therefore, return to its normal position ready to be collapsed, when the pipe 1 is at the same air condition as the high vacuum tank 4.

The teat cup comprises an inner casing 107 having webs 108 to insure a positive two sided collapsing action. An outer casing 109 having a rubber lining 110 with its ends turned back upon the ends of the outer casing passes over the inner casing 107. A screw cap 112 is threaded upon the inner casing and secures the parts together.

A hole 113 is provided in the outer casing 109 to admit air upon the exterior of the lining. More than one hole may be employed if found advisable.

The position the lining assumes when low vacuum obtains in the milk pipe 1 is shown in full lines and the position the lining assumes when high vacuum obtains therein is shown in dotted lines.

The milk pipe coupling 16 is tapered internally as shown in Fig. 4 and the ends of the milk piping are fitted tightly into the tapered portions.

What I claim is:—

1. In a milking machine, a milk pipe to which various milking units are adapted to be connected, an ejecting apparatus for releasing milk from said pipe into the atmosphere, and two vacuum tanks having unequal vacuum pressure obtaining therein, said ejecting apparatus alternately and intermittently admitting the vacuum from said tanks to said milk pipe, such alternate and intermittent action pulsating the teat-cups and drawing the milk therefrom into the milk pipe and to the ejecting apparatus.

2. In a milking machine, a milk pipe and a releasing apparatus comprising means for alternately admitting two different vacuum pressures to the said milk pipe, and releasing milk from the said milk pipe into the atmosphere substantially as set forth.

3. In a milking machine, in combination, a milk pipe, means for creating two different vacuum pressures, and means for obtaining the dual objects of alternately admitting the said two different vacuum pressures to said milk pipe and releasing the milk from that pipe into the atmosphere.

4. In a milking machine, a milk pipe, teat cups, an ejecting apparatus adapted to admit alternately two different pressures of vacuum to the milk pipe to pulsate said teat-cups and draw the milk therein into said ejecting apparatus and to release the milk into the atmosphere.

5. In a milking machine, an ejecting apparatus adapted to admit alternately two different pressures of vacuum to the milk pipe and to release milk from said pipe upon the admission of each vacuum pressure to said pipe.

6. In a milking machine, a milk pipe, two vacuum tanks, and means for obtaining unequal pressures in the tanks, in combination with ejecting apparatus, for obtaining the dual objects of admitting the said two unequal vacuum pressures alternately to the said milk pipe and releasing the milk from said milk pipe into the atmosphere.

7. In a milking machine of the kind described, a milk pipe, two tanks, means whereby unequal vacuum pressures are obtained therein, and ejecting apparatus to which each of said tanks separately communicates; said ejecting apparatus comprising means whereby the two different pressures are alternately admitted to said milk pipe and the milk drawn into the said ejecting apparatus and ejected therefrom.

8. In a milking machine, an ejecting apparatus having a milk passage therein, a main milk pipe connected with said passage, a valve face, ports from said milk passage to said valve face, ports in said valve face communicating with a source of vacuum, a slide valve operating against said valve face and having ports controlling said ports in said valve face, pocket valves swinging upon the exterior of said slide valves, and means for operating said slide valve for bringing the interior of said pocket valves alternately into communication with the milk and the vacuum ports in said valve face and with the atmosphere, substantially as set forth.

9. In a milking machine, an ejecting apparatus having a milk passage, a main milk pipe connected with said passage, a valve face, milk ports from said milk passage to said valve face, vacuum ports in said valve face communicating with the source of vacuum, a slide valve operating against said valve face, and having ports corresponding to the ports in said valve face, pocket valves swinging upon the exterior of said slide valve, each of said pocket valves covering a milk port and a vacuum port in said slide valve, and means for operating said slide valve to connect said pocket valves alternately with vacuum and open them to the atmosphere, substantially as set forth.

10. In a milking machine, a milk pipe, means for alternately admitting two different vacuum pressures to said milk pipe, said means comprising chambers into which the milk from said milk pipe is delivered, and means operating when one chamber is open to the milk pipe and milk being drawn therein, to open the other chamber to the atmosphere so that the milk entrapped therein may be released.

11. In a milking machine, a milk pipe, means for admitting a low vacuum pressure and a high vacuum pressure alternately and intermittently to said milk pipe, said means comprising chambers adapted to communicate with said milk pipe, and to which said low and high vacuum are respectively adapted to be communicated, means adapted when one chamber is cut off from the milk pipe to open the other chamber to said pipe, and means adapted when a chamber is cut off from said pipe to also cut off the vacuum thereto and to open the chamber to the atmosphere.

12. In a milking machine, a vacuum pump, two vacuum tanks of unequal air conditions, the tank of high vacuum being connected directly to the vacuum pump, and ejecting apparatus having two ports connected with said tanks respectively for admission of two different vacuum pressures, a relief valve located between the two tanks, to draw air from the tank of low vacuum pressure, into the tank of high vacuum pressure, and a relief valve located between the tank of low vacuum pressure and the atmosphere, substantially as set forth.

13. In a milking machine, a milk pipe, an ejecting apparatus having milk passages leading to the said milk pipe, a valve face to which said milk passages lead and having vacuum ports therein, a slide valve having milk and vacuum ports therein controlling said milk passages and vacuum ports, swinging pocket valves covering said ports in the slide valve, and baffle plates projecting within said pocket valves between the milk and vacuum ports in said slide valves, substantially as set forth.

In testimony whereof, I have signed my name to this specification in the presence of two subscribing witnesses.

CLAUDE HUDSON DAVIS.

Witnesses:
LEO VON HAAS,
M. GORDON.